United States Patent [19]

Jenks

[11] Patent Number: 4,541,722
[45] Date of Patent: Sep. 17, 1985

[54] CONTOUR LINE SCANNER

[75] Inventor: Earl D. Jenks, Springfield, Oreg.

[73] Assignee: JENKSystems, Inc., Springfield, Oreg.

[21] Appl. No.: 449,392

[22] Filed: Dec. 13, 1982

[51] Int. Cl.$^4$ ............................................. G01N 21/22
[52] U.S. Cl. ..................................... 356/376; 83/365; 250/571; 356/384
[58] Field of Search ............... 356/384, 385, 386, 376; 250/560, 571; 144/357; 83/365

[56] References Cited

U.S. PATENT DOCUMENTS

| | | |
|---|---|---|
| 3,806,253 | 4/1974 | Denton . |
| 3,970,128 | 7/1976 | Kohlberg . |
| 3,983,403 | 9/1976 | Dahlstrom et al. ................. 250/571 |
| 4,086,496 | 4/1978 | Berry . |
| 4,089,608 | 5/1978 | Hoadley ............................. 356/376 |
| 4,097,159 | 6/1978 | Strandberg . |
| 4,158,507 | 6/1979 | Himmel . |
| 4,186,310 | 1/1980 | Maxey . |
| 4,188,544 | 2/1980 | Chasson . |
| 4,192,613 | 3/1980 | Hammar . |
| 4,196,648 | 4/1980 | Jones et al. . |
| 4,264,208 | 4/1981 | Haberl et al. . |
| 4,294,149 | 10/1981 | Olsson . |
| 4,300,836 | 11/1981 | Homes et al. . |

Primary Examiner—R. A. Rosenberger
Attorney, Agent, or Firm—Klarquist, Sparkman, Campbell, Leigh & Whinston

[57] ABSTRACT

An edging system for sawing cants into boards includes a contour line scanner for profiling the cant and determining the combination of board widths of a specified grade which will yield the greatest economic return based on current prices. A pair of fan-like lasers positioned along a conveyor project coplanar lines of light onto the side faces of the cant to form contour lines characterizing the widthwise position and shape of the side faces. An X-Y axis TV camera is positioned above the cant for raster scanning the cant widthwise (X-axis) at close lengthwise (Y-axis) intervals along the cant to detect the contour line. The camera output signal is digitized and input to a microcomputer programed to convert the signal to pairs of digital numbers corresponding to the contour line positions at each interval. Two parallel sawlines are fit between the contour lines, one sawline touching one contour line and the second sawline touching or near the second contour line. Board values, tabulated by grade, width and length of the boards, are stored in the computer memory and used to evaluate possible combinations of standard width boards that can be cut between the contour lines for selecting the combination providing the greatest value. The elevation of the lines of light and the board values used in computing total lumber values are jointly varied for different grades of lumber.

16 Claims, 11 Drawing Figures

CONTOUR LINE SCANNER

BACKGROUND OF THE INVENTION

The present invention relates generally to automation of the processing of logs, cants and other wooden workpieces and more particularly to methods and apparatus for scanning and dimensionally analyzing such workpiece to maximize the yield of wood products therefrom. Although the invention is described in connection with processing of cants, it is also applicable to sawing and turning logs.

Many modern lumber mills now employ some type of automatic scanning equipment which feeds in formation regarding workpiece dimensions to a data processing device for analyzing the dimensional data to control cutting mechanisms. Broadly, the prior systems suffer from two disadvantages. First, such systems conventionally seek to maximize the volume of salable wood products from each log, but do not necessarily produce the most economical mix of wood products. Second, the prior systems obtain huge amounts of data about the workpieces, necessitating very large memory and computing capacity to process. Consequently, such systems are very expensive, often too expensive for small mills. It would be preferable to have a method and apparatus for controlling the processing of wooden workpieces which is capable of maximizing the economic yield in salable wood products, and yet is simpler and less expensive than those systems provided by the prior art.

In edging a cant to produce dimension lumber, any irregular margins of the cant, or wane, are cut off and the cant is sawn lengthwise into boards of various widths. A cant is typically trapezoidal in cross section and has irregular side faces, but may be square along one or both side faces, depending on how the cant is sawn from a log. In the former case, the cant is edged to square it up, by removing its irregular, triangular cross-section margins or wane. Then, in both cases, the cant is sawn lengthwise into boards of varying widths. Conventionally, the configuration of the cant is analyzed to determine the widthwise positions of several sawlines which will provide the combination of board widths that maximizes the volume of lumber produced from the cant. Similar analytic techniques are employed in sawing a log into cants.

However, the conventional optimization methods do not take into account the economic value of the lumber produced as a function of its dimensions. Also, they do not taken into account the variations in value of a board of a given dimension as a function of the grade of the lumber. The grade of a given piece of lumber is affected by a number of variables, including the presence or absence of knots, splits and rot in the wood. The grade also varies with the amount of wane, or corner truncation, remaining on the finished lumber. Conventional optimization techniques largely ignore these economic factors.

The customary approach to edging a cant is to remove essentially all of the wane, ignoring variations in the inherent grade of the wood due to knots, splits and rot. If the cant is trapezoidal, the edging process results in the loss of a triangular or trapezoidal cross section strip of wood from each side of the cant sufficient to square up the entire thickness of the cant over its entire length. This approach, in effect, saws each cant in a manner commensurate with producing the highest grade of lumber, without taking into account inherent characteristics of the wood that might prevent the resultant lumber from achieving such high grade.

Thus, by ignoring economic value as a function of both width and grade, significant amounts of otherwise marketable wood are lost. If, due to variations in market conditions, lumber of a certain dimension has a higher value on a volumetric basis than lumber of other dimensions, it is preferable to cut as much lumber as possible to the higher value dimension to maximize economic yield. However, the aggregate economic value of the wood products produced from a cant or log is not maximized by maximizing only the gross volume of lumber produced from a cant of a given width, without regard for the relative values of different dimensions of lumber. And if, because of inherent characteristics of the wood, the lumber produced could not possibly exceed a given grade level, cutting off more wane than is commensurate with that grade level wastes useful wood.

One of the most commonly-used system for scanning a cant preparatory to edging, employs a method of shadow scanning the cant as disclosed, for example, in U.S. Pat. No. 3,970,128 to Kohlberg. This system provides for a pair of illumination sources positioned above and to each side of a conveyor along which a cant is conveyed to illuminate the sides of the cant at a downward angle. A scanner is positioned directly above the cant to receive light reflected upward from the sides of the cant. The light sources are operated alternately so that one side is shaded while the other side is illuminated. In this way, the longitudinal edges of the top of the cant surface are defined by distinct shadow lines which are readily detected by the scanner. Scanning is synchronized with the alternate lighting of the illumination sources. The scanning outputs are fed to a computer for calculation of an optimum distance between two straight edging cuts and an optimum orientation of those cuts to convert the cant to a standardized finished piece of lumber with minimum wastage of material. U.S. Pat. No. 3,806,253 to Denton applies this technique to the scanning of logs.

A second technique, applied in U.S. Pat. No. 4,097,159 to Strandberg to scanning cants and in U.S. Pat. No. 4,192,613 to Hammar to scanning logs, aligns the light source and scanner on opposite sides of the workpiece so that the workpiece interrupts the transmission of light from the source to the scanner. The position of the interruption is detected by the scanner and provided to a data processor which analyzes the dimensions of the silhouette of the workpiece to control its processing.

A third scanning technique is disclosed in U.S. Pat. Nos. 4,158,507 to Himmel; 4,264,208 to Haberl, et al.; 4,294,149 to Olsson and 4,300,836 to Holmes, et al. Generally speaking, this technique employs scanning a beam across back and forth or lengthwise along the workpiece, using a beam pivoting device, and measuring the dimensions of the surfaces of objects scanned by triangulation or reflected light intensity techniques.

A fourth technique disclosed in U.S. Pat. No. 4,188,544 to Chasson and various patents cited therein uses a television camera and a fan-line laser projected downwardly onto a workpiece at different acute angles for detecting the intersection line of a plane of light produced by the laser and the workpiece and calculating dimensions of the workpiece surface by using known distances and geometric relationships. Systems similar to that of Chasson are also disclosed in U.S. Pat.

Nos. 4,086,496 to Berry; 4,186,310 to Maxey and 4,196,648 to Jones, et al. These systems all use a separate set of scanners and light source at each scanning interval along the cant.

As mentioned above, all of the foregoing lumber processing control systems analyze the dimensions of the workpiece and control their processing to maximize the volume of usable wood products to be produced from the workpiece. None of them are known to take into consideration the relative economic value or grade of the products. For the most part, the analytic methods employed in these systems involve mapping the entire surface of the workpiece. Therefore, sufficient memory (e.g., 256,000 bytes) must be provided in the data processor to store three-dimensional spatial coordinates of the workpiece. Substantial computing capacity, such as is provided by a main frame or minicomputer, is required.

Also, data acquisition time in such systems is long, one second or more. This does not leave time for much analysis when trying to edge 15 to 20 cants per minute. Speed is especially important when handling relatively narrow cants, under 16 inches, because of the need for high volume throughput to economically edge narrow cants. Long data acquisition processing time virtually precludes application of prior automated scanning and analysis techniques to small-log lumber mills. Typically, edger operators in such mills, unaided by any automated analysis, only have time to briefly view each cant, make a snap decision and push a button. The resultant decisions are typically not optimal.

Referring to the aforementioned Chasson patent, the amount of memory and computing capacity required can be reduced somewhat by sampling the dimensions of the workpiece at intervals spaced along the length of the workpiece. However, this approach sacrifices substantial accuracy. It can miss significant variations in the contours of the workpiece between sampling intervals, which are conventionally positioned six inches or more apart. And the time and cost savings are too little to enable use of low cost microcomputers for conducting extensive analysis of edging options.

Accordingly, there remains a need for a scanning and analysis system which is capable of accurately characterizing the dimensions of a workpiece, without requiring storage and processing of vast amounts of data, and controlling the processing of the workpiece so as to maximize the economic value of the wood products produced therefrom.

SUMMARY OF THE INVENTION

It is therefore one object of the invention to provide an improved method and apparatus for scanning, analyzing and controlling the processing of logs, cants and the like for optimum yield.

A second object of the invention is to increase the yield of salable wood products produced from wooden workpieces.

A third object is to maximize the value of lumber of a specified grade that can be cut from a workpiece of a given size and wood quality.

Another object of the invention, as aforesaid, is to simplify the scanning and analysis of the workpieces so that they can readily be carried out on a microcomputer, yet obtain an accuracy commensurate with sampling increments of less than one inch and speeds commensurate with edging 15 to 20 or more cants per minute.

A further object is to reduce the cost of apparatus for scanning and analyzing wooden workpieces to be processed into dimension lumber, yet improve the analysis and increase the throughput over prior such apparatus.

A more specific object of the invention is to maximize the aggregate value of boards of different sizes that can be cut from a cant of a given size.

Yet another object is to maximize the total value of lumber that can be cut from an irregularly-shaped cant containing wood of a given quality.

In accordance with the invention, the foregoing objects are realized in a contour line scanning system which projects coplanar lines of light onto opposite sides of a wooden workpiece in a plane parallel to the width of the workpiece to form a contour line along each side. The contour lines define the width of the workpiece in the aforementioned plane and characterize any irregularities in the sides of the workpiece. A sensor means is directed toward the workpiece for sensing the contour lines and producing an output signal corresponding to the position of such lines. This output signal is input to a computer or other suitable means programed for determining an optimum sawline through the workpiece, as a function of stored values of lumber of different dimensions, from the widthwise profile of the workpiece as characteristized by the contour lines.

In a preferred embodiment, such a system adapted for edging a cant has beam-forming means positioned to direct thin, coplanar sheets of light towards the opposite narrow side faces of the cant in a plane positioned between and parallel to the broad faces of the cant. For processing trapezoidal cross section cants, a single scanner can be used, positioned above or below the cant and directed normal to the plane of the sheets of light to sense both contour lines. The contour lines are stored in memory as digitized lateral positions and therefore require minimal memory, for example, 1024 bytes per scanner. The elevation of the contour lines on the side faces of the cant establishes a specified grade line. The specified grade can be varied by shifting one of the cant or the beam-forming means up and down or by providing multiple beam-forming means at different elevations, to be alternately switched on to establish the grade line at different elevations on the side face of the cost. Elevating the grade line, that is, moving it toward the narrower broad face of the cant, improves the grade of lumber to be produced from the cant as a function of amount of wane or corner truncation while decreasing the volume of salable lumber. The computer also includes memory for storing values of lumber of different grades and widths. An operator can specify a lumber grade based, for example, on a visual inspection of the quality of wood in the cant. From the spacing between the contour lines at the specified grade line, the computer determines a useful width of the cant between the lines. Then, using the stored values of various widths of lumber of the specified grade, the computer determines a combination of board widths, totaling no more than the previously-determined useful width, that will yield the greatest economic value of dimension lumber capable of being produced from the cant.

The apparatus and method employed in the foregoing preferred embodiment can be readily adapted to other aspects of wood processing. For example, it can be used for edging cants that are square along one or both sides by positioning two scanners above or below the cant at acute angles to the coplanar beams of light. In either case, the cant is sawn along sawlines normal to the beams of light. In other words, the sawlines are aligned with the direction in which the beams of light are raised or lowered to vary the position of the contour lines on the side faces of the cant. The scanning system employed in the preferred embodiment can also be readily adapted to scanning of whole logs or turn downs for cutting into cants. In such case, the sawline is aligned parallel to the plane of the beams of light and the positioning of the log normal to such plane is controlled for sawing cants, each containing lumber of the maximum possible value, from the log. The system can also be programmed with tables of values varying with length as well as width and grade of lumber so that logs, cants or lumber can be bucked into selected lengths of maximum value by cutting them crosswise along sawlines normal to their length.

One important advantage of the invention is that it enables processing of a wooden workpiece to produce a mix of wood products having the maximum aggregate value, rather than merely a maximum volume of wood. Another important advantage is that it enables utilizing the greatest possible width of a cant to produce lumber. This advantage is enhanced by sawing boards having a maximum predetermined amount of corner truncation in accordance with the specified grade of the lumber. In doing so, the amount of wane to be chipped or otherwise discarded can be substantially reduced from that of prior wood processing control systems. A third advantage is that the data processing can readily be performed by a microcomputer. Thus, apparatus costs can be nearly an order of magnitude less than in prior systems. A further advantage is that scanning analysis and edging control can be performed quickly enough, even on a microcomputer, for the system to meet the throughput demands by small-log mills. The capability of sophisticated analysis is thereby made available where it can provide the greatest benefits.

The foregoing and other objects, features and advantages of the invention will become more readily apparent from a detailed description of a preferred embodiment which proceeds with reference to the accompanying drawings.

DETAILED DESCRIPTION OF A PREFERRED EMBODIMENT

Physical Arrangement of System

Figures 1, 2, 3:
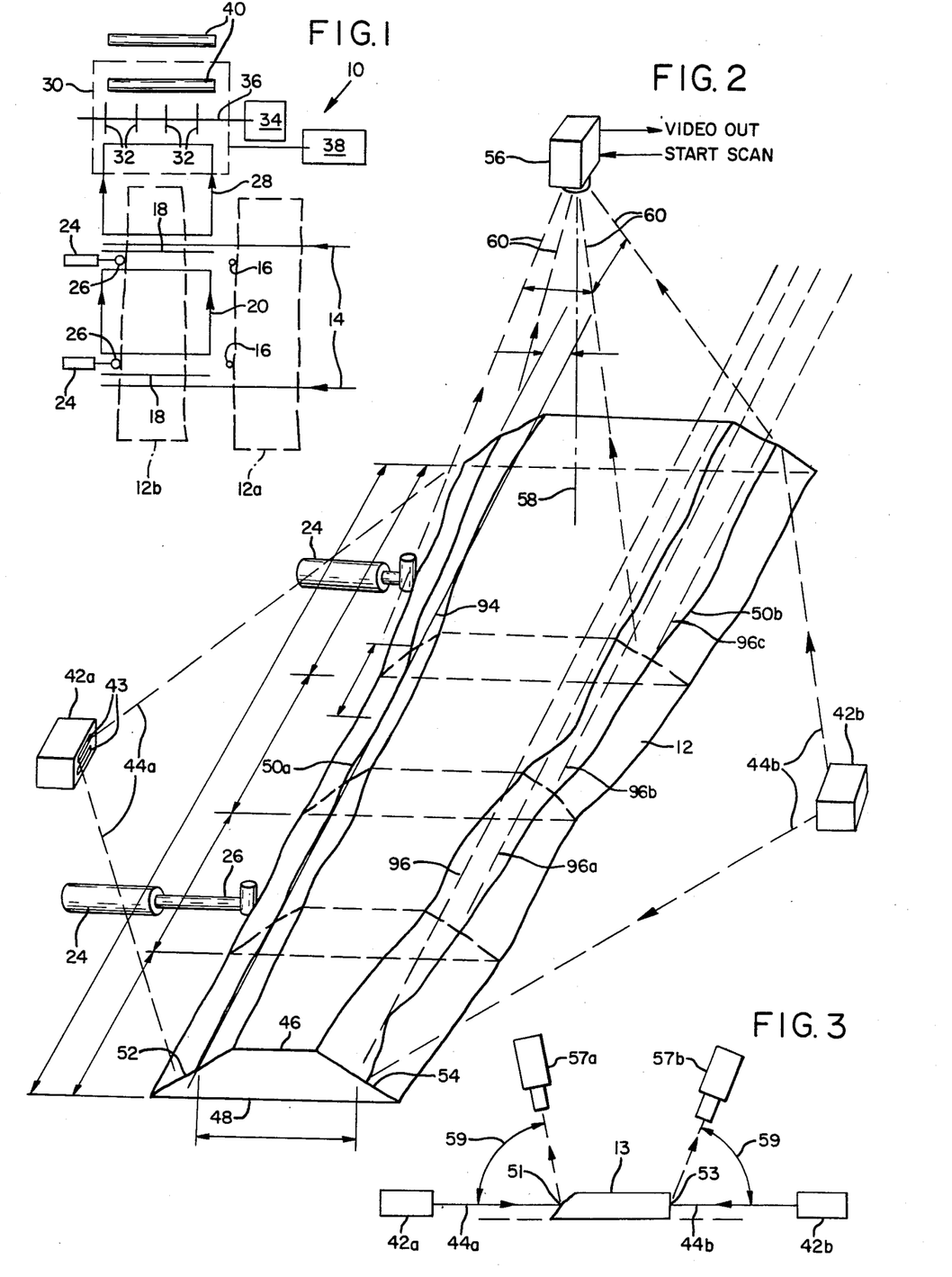
FIG. 1 is a top plan view of an edger system with cants shown in phantom lines at various positions in the system.
FIG. 2 is a perspective view of the system of FIG. 1, including cant scanning and positioning elements of a contour line scanner in accordance with the invention.
FIG. 3 is an alternative embodiment of the cant scanner of FIG. 2, as seen in an end view of the cant.

Referring to FIG. 1, an edger system 10 for edging cants is positioned in a lumber mill downstream from a headrig or similar sawing apparatus (not shown) which saws a log into lengthwise slabs or cants 12. The cants are conveyed sideways by transfer chains 14 to stop pins 16, which temporarily hold the cant 12a while a previous cant 12b is being processed. Downstream of the stop pins are a pair of lift skids 18 positioned at opposite ends of a first roller chain infeed conveyor 20. The infeed conveyor is oriented to convey the cants at right angles to transfer chains 14. The lift skids are raised to receive a cant from the transfer chains and lowered to place it on the first infeed conveyor.

Adjacent each of the lift skids, on the opposite lateral side of infeed conveyor 20 from stop pins 16, is an infinite setting lineup pin 24. Such pins have hydraulically or pneumatically powered rams 26 which are extended or retracted laterally of conveyor 20 to position the cant laterally on the lift skids for infeeding to the saws, as next described. Downstream of coneyor 20 is a second roller chain infeed conveyor 28 positioned to receive the cants from conveyor 20 and convey them forwardly into an edger 30.

The edger comprises a series of parallel saws 32 spaced across the path of conveyor 28 and driven by a drive motor 34 through shaft 36. The saws are movable axially of shaft 36 and their position is controlled by an edger saw setting system or set works 38. Downstream of the edger saws is an outfeed conveyor 40. Details of construction and operation of the mechanical elements shown in FIG. 1 are known in the art and, not forming a part of the present invention except insofar as they are used in combination with the apparatus described hereinafter, need not be further described.

Turning to FIG. 2, fan line lasers 42 are positioned on opposite sides of the conveyor 20 for projecting lines of light laterally toward the sides of the cant, while it is supported on the lift skids. For clarity, the lift skids and conveyors are omitted from FIG. 2 and the remaining Figures. Alternatively, the fan line lasers 42 can be positioned on opposite sides of conveyor 20 at a distance from its ends, as shown in phantom lines in FIG. 4. In either case, the fan line lasers are positioned to project coplanar fan-like sheets of light 44 in opposite directions across conveyor 20. These fans of light are mutually oriented parallel to a plane defined by the upper surfaces of the lift skids and thereby parallel to the broad upper and lower faces 46, 48 of cant 12. When a cant is positioned between lasers 42, the light beams 44 project lines of light 50 onto opposite side faces 52, 54 of the cant.

As illustrated in FIG. 2, each fan line laser 42 contains two or more fan line laser elements 43 and electrical circuitry for selectably switching on alternate elements. Such elements are vertically spaced to form grade lines at different selectable elevations on the sides of the cant.

Centered above conveyor 20 is a television camera 56. A second such camera (not shown) can be positioned below conveyor 20 so that the cants need not be turned over to position their narrower broad faces 46 facing upwardly. Camera 56 is aimed downwardly at the cant with the centerline 58 of its field of view normal to the plane of beams 44 and therefore substantially normal to the upper face 46 of the cant. The field of view of camera 56 is sufficient to cover the area indicated by dashed lines 60, as discussed further below. The foregoing arrangement is used in lumber mills wherein the cants are cut by a headrig and, therefore, have a generally trapezoidal cross-sectional shape.

In some mills, cants are cut from a log by a resaw machine in what is referred to in the art as a turndown sawing procedure. Referring to FIG. 3, that procedure produces cants 13 having a single triangular profile edge face 51 and a rectangular or squared-off edge face 53, or two squared-off edge faces. Since the squared-off edge faces are parallel to the centerline 58 of the field of view of camera 56, it is necessary to use two cameras 57 positioned above the cant at an acute angle 59, for example, 45°, from the plane of beams 44 for viewing the contour lines on the squared-off faces of the cant.

Figure 4:
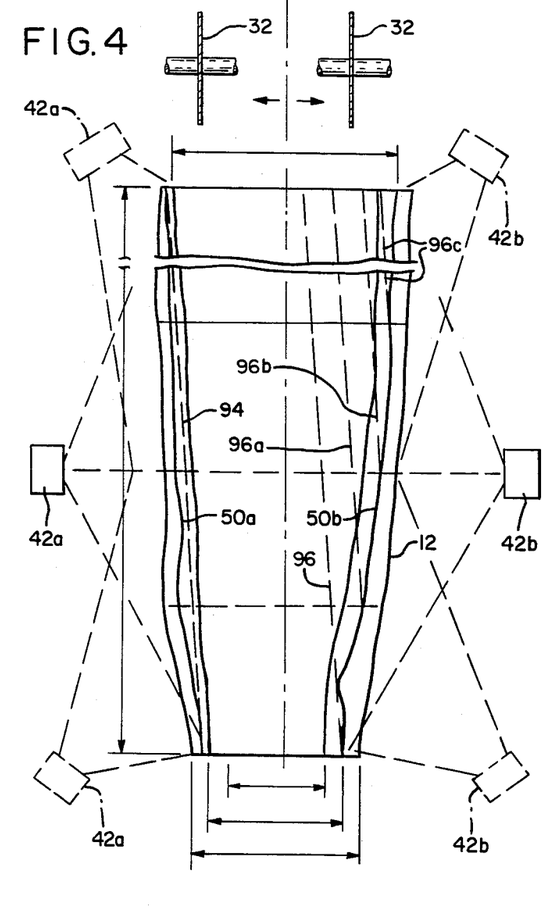
FIG. 4 is a top plan view of portions of the edger system and scanner of FIGS. 1 and 2, including two of the edging saws, alternate positions for the fan-line laser elements being shown in phantom lines.

Camera 56 is positioned at an elevation and provided with lenses such that it has a field of view sufficient to encompass the full width of the widest cants that will normally be processed by the particular mill in which the system is installed. For most mills, a field of view of, for example, 60 inches, will suffice for scanning cants up to 40–45 inches wide and up to 60 inches in length. For stud mills, which cut cants of just 8 feet in length, a single set of lasers and camera, positioned to scan the narrow end of each cant, will suffice. For longer cants, multiple sets of fan line lasers and cameras are ordinarily positioned at overlapping intervals, for example, 4 feet apart, lengthwise along the cant. The additional fan line lasers (not shown) are aligned to project sheets of light in the same plane as lasers 42. Alternatively, a total of four fan line lasers, positioned as shown in phantom lines in FIG. 4, are used, with as many additional cameras as are needed for the maximum length cants that are to be edged. The additional cameras 56a, 56b (FIG. 7) are aimed at the cant in the same manner as cameras 56, 57. Each camera is oriented with its horizontal scanning direction across the cant. Each scan line in a single frame (e.g., 512 lines per frame) thereby corresponds to a lengthwise increment along the cant of, for example 3/32 inch.

Sensing and Control Apparatus

Figure 7:
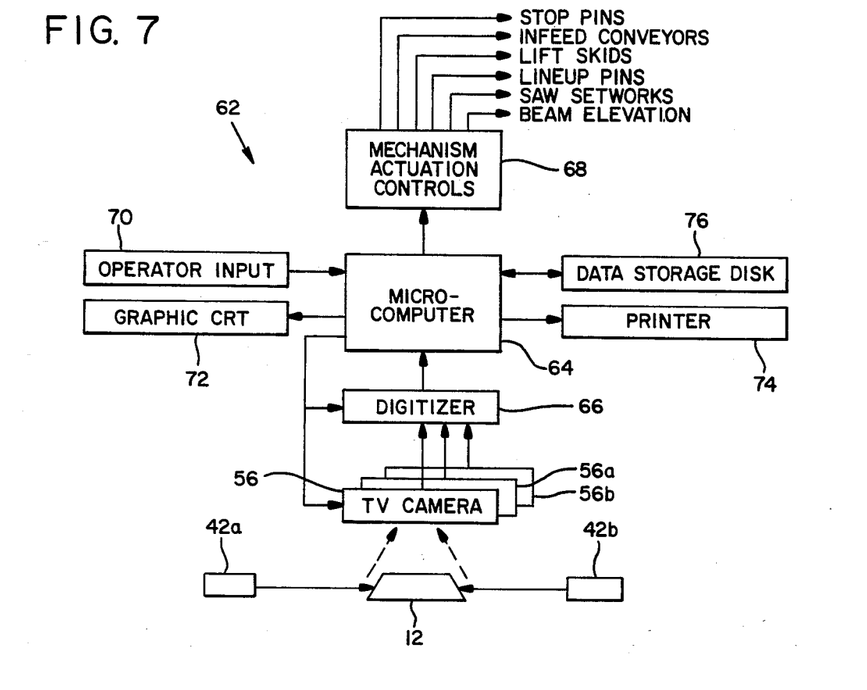
FIG. 7 is a block diagram of the contour line scanning system of FIGS. 1 and 2.

Referring to FIG. 7, sensing and analysis of the cant and control of the edging process is accomplished by system 62. The central components of this system are the aforementioned fan line lasers 42 and cameras 56, a digital computer 64, a digitizer 66, operationally connecting the cameras to the computer, and various conventional mechanism actuation control devices 68 operably connected to the computer. Peripheral devices connected to the computer include an operator input device 70, such as an alphanumeric keyboard, a graphic cathode ray tube (CRT) display 72, a printer 74, and a data storage disk 76 or other suitable mass memory device.

Computer 64 is preferably a commercially-available microcomputer, such as the APPLE 2+ microcomputer, equipped with an integral operator keyboard 70 and compatible peripherals 72, 74, 76. A camera 56 and digitizer 66 suitable for use with such microcomputer are the SANYO VC161OX camera and the DITHERTIZER II video digitizer, manufactured by Computer Stations, Inc., St. Louis, Mo. This digitizer converts the analog output signal of the images detected by the camera into digital signals which can be processed by the computer. Software is described hereinafter for analyzing such signals and generating and storing positions of the contour lines in the computer memory.

Overview of Edging Operation

In general, this invention seeks to establish a pair of grade lines on opposite sides of a cant, determine the maximum width of the cant between two parallel sawlines positioned between the grade lines, and determine the optimum position of two or more sawlings through the cant to produce the maximum total value of lumber.

Figure 6:
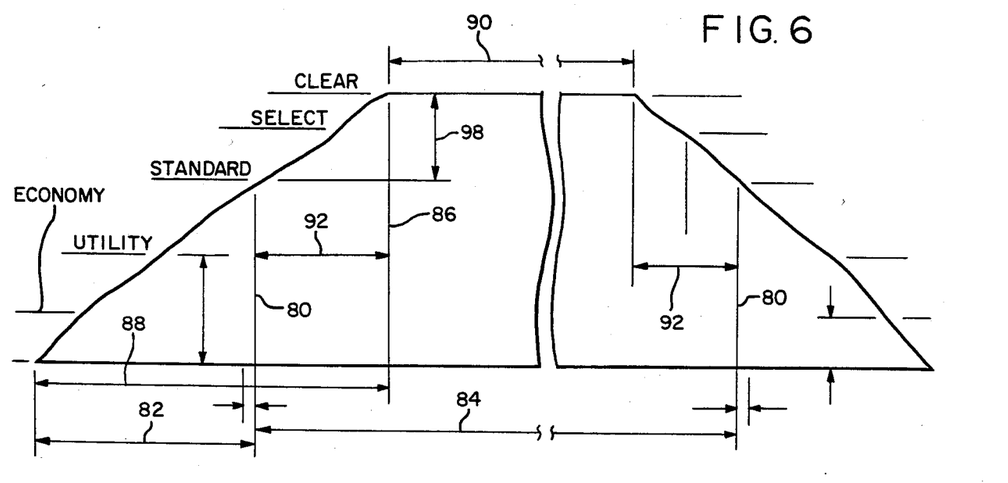
FIG. 6 is an enlarged cross-sectional view of the cant of FIG. 4 showing the relative elevations of different grade lines along its side faces.

Referring to FIGS. 4 and 7, the operator visually grades the cant and inputs a selected grade via keyboard 70, causing the computer 64 to switch on the appropriate pair of fan line laser elements 43 to project light beams 44 onto the cant and thereby establish contour lines 50 at the selected elevation or grade line. Referring to FIG. 6, the conventional grade lines, in terms of permissible amounts of residual wane, are Economy, Utility, Standard, Select and Clear. Because the wane is generally triangular, selecting a higher grade, and thereby elevating beams 44, increases the amount of wane to be sawn from the cant and commensurately decrease the maximum available or usable board width. For example, selecting "Standard" grade necessitates cutting the cant along lines 80, which removes an amount of wane from each side indicated by arrow 82 and produces a maximum usable width, as indicated by arrow 84. Selecting "Clear" grade necessitates cutting along line 86, nearer the center of the cant than lines 80, thereby removing wane 88 and producing a narrower usable width 90. If the inherent quality of the wood in the cant is only "Standard" grade, but the cant is cut for "Clear" grade, as frequently happens in conventional edging operations, the amount of material indicated by arrows 92 is needlessly removed as wane. Such waste is greatly reduced by varying the elevation of the grade line in accordance with the grades of the cants and then edging the cants at a lateral position determined by the grade lines.

Once the grade lines are set and contour lines 50 thereby formed, sawlines are determined in two steps. First, referring to FIGS. 2 and 4, one sawline 94 is drawn (within the computer) along contour line 50a. Line 94 is positioned between the contour lines so as to touch line 50a at two or more points, without crossing it.

Figure 5:
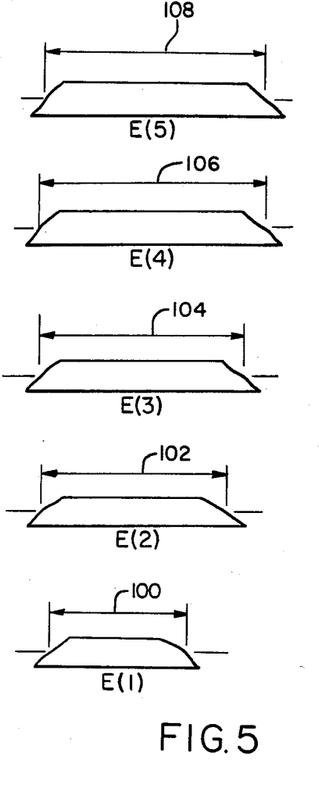
FIG. 5 is a series of cross-sectional views taken at spaced intervals along the cant of FIG. 4.

Then, a second line 96 is drawn parallel to the first sawline, along the second contour line 50b. The second line touches contour line 50b at its closest approach to sawline 94, that is, at the narrower end of the cant. The spacing between the first and second lines 94, 96 determines the maximum usable full-length width of the cant, as indicated by end cross-section 100 in FIG. 5. The second line 96 is not necessarily the second sawline. The second sawline (not shown) is parallel to line 96 and may be positioned on it or to either side of it, depending upon the results of subsequent computer analyses of the potential yield of the cant and on any variations of width along the cant at shorter lengths, as next described.

If the cant is less than a specified minimum length, such as 10 feet, analysis of the best positions to saw the cant for maximum yield is made only once, for its maximum usable length—8 feet. If the cant is longer than 10 feet, it is desirable to first determine the maximum useful full length width and the best yield for that width, and then analyze and compare potential yields at different lengths less than its maximum length. This analysis is performed at two foot intervals, starting at the narrow end of the cant and proceeding toward the wide end, until the minimum useful length is attained. This procedure is illustrated in FIG. 4 by lines 96a, 96b, 96c, and in FIG. 5, wherein the maximum useful width for a selected grade, e.g., "Standard," is denoted at each interval of length by arrows 100, 102, 104, 106, 108.

Typically, several possible combinations of board widths can be cut from a cant of a given useful width. For example, a 24 inch wide cant can be sawn into four 6 inch, three 8 inch, or two 12 inch wide boards, or any of a large number of combinations of different board widths. Depending on current lumber market conditions, the aggregate values of the possible combinations for a given total width will typically differ. As further described below, the combination yielding the maximum aggregate value is determined at each usable width, and the length producing the greatest value is selected. Then, the combination of widths producing that greatest value for that length is identified. From that data, the positions of the second sawline and of any additional sawlines needed to cut the cant into the identified combination of widths are determined.

Referring back to FIGS. 1 and 7, the first, second and additional sawline positions are used by computer 56 to control the positioning of the cant and the edging saws. Through actuation controls 68, the computer actuates the lineup pins 24 to angularly reposition the cant, supported on the lift skids 18, so that the sawlines parallel saws 32. Simultaneously, the computer actuates the saw setworks 38 to laterally position the saws to cut the cant along the selected sawlines. When this alignment procedure is completed, the computer initiates a re-scan of the cant to verify its position and adjust the position if necessary. Then, it causes the lift skids to lower the cant onto conveyors 20, 28 and starts the conveyors (if not continuously running) to feed the cant through the saws. Finally, the stop pins 16 are actuated to allow the next cant to be infed to the scanning station, so that it too can be scanned and analyzed as discussed above.

This aligning procedure positions one of the sawlines 94 in touching relation but not crossing contour 50a. In general, this causes the sawlines to be at an angle to the centerline of the cant, thus providing a greater area of useful wood than if the sawlines were parallel to the centerline of the cant. However, the procedure may be deoptimized if it is desired to produce nondiagonal grain lumber.

Following is a description of the software used to implement the foregoing procedures.

Program Operation and Data

The foregoing process is controlled by a main routine, which is set forth below. So that it can be more readily understood, the main routine is listed in a generalized flow chart form which can be readily implemented in any desired programing language by a skilled programer. In subsequent sections, the data arrays and various subroutines used in the main routine are described in further detail.

Main Routine

The main routine is presented in the form of a functional description of program operation in the following listing. Each step in the operation is described in a statement which is not specific to any particular programing language, but can readily be implemented in any desired computer language by a programer ordinarily skilled in such language. Variables and data arrays generated by each operation are identified after a colon following each statement. Parenthesized variables indicate dimensions of arrays of variables, as further discussed in the following section with reference to FIGS. 8–11. Further explanation of each step is provided as needing in a comment following the statement, or in a detailed explanation in subsequent sections.

100 START MAIN ROUTINE
105 STORE CURRENT LUMBER PRICES: VAL (I, J, K)
107 GENERATE POSSIBLE COMBINATIONS OF BOARD WIDTHS AND TOTAL WIDTH OF EACH COMBINATION: COMB (J, R), TW (R)
108 DETERMINE TOTAL VALUES OF ABOVE BOARD COMBINATIONS AND SORT ROWS (R) BY DESCENDING
VALUE: TV (I, COMB, K)
  Comment: Steps 105, 107, 108 are explained in the following section "Data Arrays."
110 INFEED CANT
  Comment: This step actuates the stop pins to allow next cant to be conveyed onto the lift skids.
112 INPUT GRADE OF CANT: K=?
  Comment: This step determines the beam elevation required to form contour lines at a selected level or grade line as shown in FIG. 6.
113 POSITION GRADE LINE
  Comment: This step actuates positioning of the light beam to the predetermined elevation corresponding to maximum allowable corner truncation for a selected grade.
115 SCAN CANT, DIGITIZE AND STORE COUNT DATA CORRESPONDING TO POSITIONS OF CONTOUR LINES AT EACH SCAN: CL (M, N)
  Comment: This step is explained in the following section "Scanning and Digitizing Contour Lines."
120 SMOOTH CONTOUR LINES
  Comment: This step eliminates contour line data points that deviate sufficiently from adjoining points to indicate a probable error.
125 DETERMINE MAXIMUM USABLE LENGTH OF CANT: I=ML
  Comment: Length is determined by finding and subtracting the incremental positions of the first and last nonzero values of CL in the N dimension; maximum usable length is the next shorter multiple of 2 feet
130 DETERMINE FIRST SAWLINE TOUCHING FIRST CONTOUR LINE: SL (1, N)
  Comment: The first sawline is determined by any desired method. Array SL is an array like array CL.
132 DETERMINE NARROWEST END OF CANT.
  Comment: This is done by finding the lengthwise position of the minimum difference between the first and second contour lines.
135 STARTING AT NARROWEST END OF CANT, DETERMINE SECOND STRAIGHT LINE PARALLEL TO FIRST SAWLINE AND TOUCHING SECOND CONTOUR LINE AT A LENGTH I: SL (2, N(I))
  Comment: Since this line is parallel to the first line, it can be defined by identifying the point N(I) on the second contour line nearest the first sawline between length I and I - 2 feet.

140 DETERMINE MAXIMUM USABLE CANT WIDTH BETWEEN FIRST AND SECOND STRAIGHT LINES AT LENGTH I: CW (I)

Comment: Initially, this width is the minimum full length width determined in step 132. At shorter lengths, it is the distance between the first contour line and the point identified in step 135.

145 FIND TOTAL WIDTH TW LESS THAN CW(I) HAVING MAXIMUM TOTAL VALUE TV(I); MTV(I)

Comment: This step is explained in the following section "Data Arrays."

150 REPEAT STEPS 135, 140, 145, DECREASING L IN 2 FOOT INCREMENTS UNTIL LENGTH I=8 FEET

Comment: In stud mill operations, this operation is only performed once because the cants are typically about 8 feet long.

155 FIND GREATEST MTV(I)

160 LOOK UP ASSOCIATED COMBINATION OF BOARD WIDTHS AND TOTAL WIDTH: MCOMB, MTW

165 ACTUATE LINEUP PINS TO POSITION CANT WITH FIRST SAWLINE AT A PREDETERMINED ORIENTATION (E.G., PARALLEL) TO EDGING SAWS

170 RESCAN CANT FOR FIRST CONTOUR LINE, REDETERMINE FIRST SAWLINE, AND REPOSITION CANT IF FIRST ORIENTATION IS NOT CORRECT

Comment: This step provides feedback to make sure that the lineup pins actually position the cant as desired. It essentially repeats steps 115 through 130.

175 ACTUATE SETWORKS TO ALIGN FIRST SAW LATERALLY WITH FIRST SAWLINE, TO POSITION SECOND SAW AT A SECOND SAWLINE AT DISTANCE OF TOTAL WIDTH MTW AND TO POSITION ADDITIONAL SAWS BETWEEN FIRST AND SECOND SAWS TO SAW BOARD WIDTHS IN ACCORDANCE WITH SELECTED COMBINATION

185 ACTUATE LIFT SKIDS TO LOWER CANT ONTO INFEED CONVEYORS

190 RETURN TO STEP 110

In the foregoing flow chart listing, various data arrays and variables are identified. Following is a further description of such arrays and how they are developed.

Data Arrays

Figure 8:
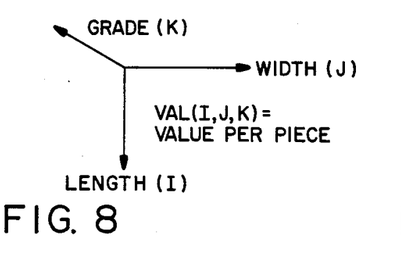
FIGS. 8-11 are diagrams illustrating the principal data arrays used by the microcomputer of FIG. 7.

Referring to step 105 in "Main Routine," current lumber values are input to the computer whenever they change, ordinarily on a weekly basis. Such values are conventionally available from market reports published in the form of tables of prices organized with columns for each length and rows for each width of a given type, thickness and grade of lumber. The prices are given in dollars per thousand board feet. In a typical edging operation the type and thickness of the lumber are constants, so only length, width, grade need be considered in organizing a data array for a single edger. Referring to FIG. 8, a three dimensional array VAL (I, J, K) is created in the computer memory to receive lumber price data as a function of length (I) in two foot increments from 8 to 20 or more feet; width (J) in two inch increments from 3.625 to 11.625 inches; and grade (K), such as Standard, Select, Clear, Utility and Economy. The raw prices are input and then column-wise divided by the number of boards of each length per 1,000 feet to convert them to value per piece of lumber.

Depending on lumber conditions, only a few grades might be used, for example, just Standard and Select grades. Similarly, only a few widths and lengths might be used. For example, a small log stud mill would only use 8 foot lengths and might cut only up to 8 inch widths.

Figure 9:
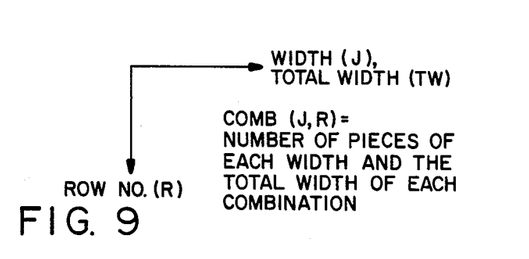

Next, referring to step 107 and FIG. 9, a two-dimensional array COMB (J, R) is generated, listing in rows (R), each combination of board widths (J) having a total width less than the width of the edger, for example, 40 inches. Also, since each edger has a fixed number of saws, only combinations containing fewer boards than the number of saws are listed. For each combination, a total width TW(R) is generated by multiplying the number of boards of each width by such width and summing the products. This data is added as a column to the COMB(J,R) array.

Figure 10:
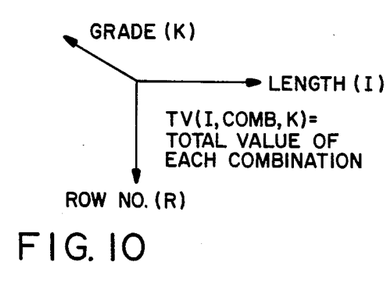
Figure 11:
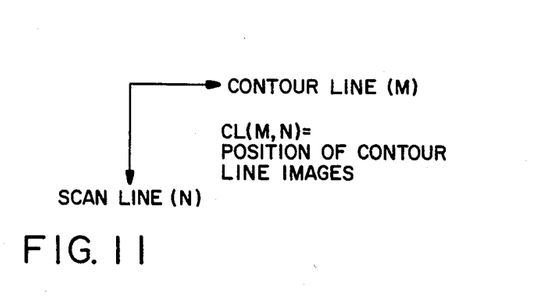

Then, step 108 causes a three-dimensional array of total values of lumber of board widths and for each length and grade, for each combination to be generated, as illustrated in FIG. 10. This array, TV (I, COMB, K), is generated by multiplying, for each length and grade, the number of boards of each width in a combination by price VAL (I, J, K) and summing the product. This array will have as many columns as there are different lengths and grades in the VAL (I, J, K). In the aforementioned example of a stud mill which cuts only Standard and Select grade studs, array TV would consist of only two columns.

The arrays of FIGS. 9 and 10 can now be used to economically optimize the edging of a cant. However, to execute best selection of the best combination more quickly, it is preferable to rearrange the rows of such arrays in order of descending total width and value. It is also desirable to delete combinations which utilize the same total width but yield less total value than other combinations, retaining the latter. It should be understood that, as market values change, the relative total values for different combinations may change, so the foregoing rearranging and deleting steps should be performed each time lumber values change. The following table lists small portions of an example of the combination and total value arrays, COMB (J, R) and TV (I, COMB, K), for Standard grade, nominally two inch (actually 1.625") thick, 16 feet long lumber.

TABLE 1

| Row No. | (40" Width Edger, 5 saws, 0.125" Kerf) | | | | | Total Width | Total Value |
|---|---|---|---|---|---|---|---|
| | Nominal Board Widths | | | | | | |
| | 4 | 6 | 8 | 10 | 12 | | |
| 1 | 1 | 0 | 0 | 0 | 3 | 39 | 26.83 |
| 2 | 0 | 1 | 0 | 1 | 2 | 39 | 26.41 |
| 3 | 0 | 0 | 0 | 4 | 0 | 39 | 25.64 |
| 4 | 0 | 0 | 1 | 2 | 1 | 39 | 25.54 |
| 5 | 0 | 0 | 2 | 0 | 2 | 39 | 25.48 |
| 6 | 1 | 0 | 0 | 1 | 2 | 37 | 25.08 |
| 7 | 0 | 1 | 0 | 2 | 1 | 37 | 24.66 |
| 8 | 0 | 1 | 1 | 0 | 2 | 37 | 24.58 |
| 9 | 0 | 0 | 0 | 0 | 3 | 35.25 | 24.48 |
| 10 | 0 | 0 | 1 | 3 | 0 | 37 | 23.81 |
| 11 | 0 | 0 | 2 | 1 | 1 | 37 | 23.73 |
| 12 | 0 | 2 | 0 | 0 | 2 | 35 | 23.68 |
| 13 | 1 | 0 | 0 | 2 | 1 | 35 | 23.33 |
| 14 | 1 | 0 | 1 | 0 | 2 | 35 | 23.25 |
| 15 | 0 | 1 | 0 | 3 | 0 | 35 | 22.91 |

The foregoing table is arranged in descending order of total values, but no rows are deleted in order to show the various combinations at a given total width. In practice, only the best total value at each total width—rows 1, 6, 9 and 12 in the portion shown above—would be retained, thereby greatly reducing computer memory requirements and average execution time. Alternatively, the best two or three combinations at a given total width could be displayed so that the operator has the option of selecting a non-optimal combination (as determined automatically) based on, for example, visually observable grade-related criteria such as location of defects.

For purposes of illustration, Table 1 combines the array of FIG. 9 with a single column of the array of FIG. 10. In practice, the rightmost column "Total Value" may be but one of many columns of the three-dimensional array of FIG. 10. Referring to FIGS. 9 and 10, it will be observed that each array contains numbered rows. The row numbers are included in array TV (FIG. 10) so that they can be used as an index to aid in looking up the combination in array COMB (FIG. 9) that is associated with each row of total values in array TV.

When the rows in array TV are rearranged in order of descending value, the row numbers are likewise rearranged. The rows in array COMB are preferably initially arranged in order of descending total width. Using row numbers R as an index, step 145 in "Main Routine" can thus be performed in the following steps:

200 START
210 IN ARRAY COMB (J, R) SEARCH DOWN TW (R) COLUMN FOR FIRST TW (R=R1) LESS THAN CW (I=I1)
220 IN ARRAY TV SEARCH DOWN THE ROW COLUMN AT GRADE K=K1, FOR FIRST ROW NUMBER R EQUAL TO OR GREATER THAN R1.
230 SHIFT ALONG ROW R2 TO COLUMN TV (I=I1)
240 SET MTV (I1)=TV (I1)

In performing step 150, the row number R for each MTV (I) is stored. The stored row number associated with the greatest MTV(I) found in step 155 (e.g., row number R2) is then used in step 160 to look up the combination MCOMB (J, R2) and total width MTW (R2).

Once the foregoing data arrays are stored, the system is ready to scan cants and for analysis and edging in accordance with the above-described programs.

Scanning and Digitizing Contour Lines

Referring to step 112 of the Main Routine, the operator initiates scanning of a cant positioned in the scanning station by visually observing the cant, judging its quality independently of amount of wane, and inputting into the computer a grade based on that quality. Step 113 causes the computer to switch on one of the pairs of fan line laser elements 43, to position the beams 44 so as to delineate, by contour lines 50, the maximum permissible wane for the selected grade. For example, if the cant is judged to be of Standard grade, then the operator keys in K=1. Referring to FIG. 6, the computer responds by switching on the elements 43 whose beams 44 are positioned to form contour lines 50 at the Standard line, one-fourth of the thickness of the cant from its narrower broad face, as indicated by arrow 98. The variable K=1 is then stored by the computer for application to all subsequent steps of the Main Routine which are affected by grade K.

Next, in step 115, the computer actuates the camera 56 and digitizer 66 and branches to subroutine LINES which, in general terms, stores the positions of the images of the contour lines in the computer memory in array CL (M, N). The camera scans the cant in horizontal scan lines oriented normal to the length of the cant. Each scan produces an analog signal which includes signal levels corresponding to the contour lines. The digitizer 66 divides each scan line in the analog output signal from the camera 56 into, for example, 512 segments or pixels and assigns a digital value to each pixel corresponding to its analog value. The digital value expresses these values in numerical levels of gray scale, for example, from binary 0000 (zero) for the darkest level to binary 1111 (15) for the lightest level. The contour lines are, therefore, expressed as relative light levels and can be sensed by comparing each pixel value to a predetermined threshold between levels corresponding to the background light and the contour lines. The subroutine LINES then create a numerical description of the contour lines 50, based on their lateral position relative to, for example, one side of the field of view of camera 56. Following is a functional listing of subroutine LINES, in which N identifies each scan line, M identifies each contour line, and P is the count for each pixel.

300 START LINES
305 START CAMERA AND DIGITIZER
310 SET N=1
   Comment: This step identifies the first scan line.
320 SET M=1, P=0
   Comment: This step identifies the first contour line and starts the pixel count.
325 SET P=P+1
330 GET PIXEL (P)
   Comment: This step accesses subroutine CONTOUR to read the Pth pixel.
340 IF PIXEL (P) IS GREATER THAN THRESHOLD, SET CL (M, N)=P; M=2
   Comment: This step compares the pixel value with the threshold and, if such value corresponds to the level of a contour line, stores the position of the first pixel in the first contour line memory location M=1 at scan line N and identifies second contour line.
350 IF P LESS THAN 512, GO TO STEP 325
   Comment: This step repeats steps 325-350 for scan line N until all pixels in the line have been tested and both contour line positions have been stored for scan line N.
360 SET N=N+1
   Comment: This step increments to next scan line.
370 IF N LESS THAN 512, GO TO STEP 320
   Comment: This step restarts procedure for next scan line until last scan in field is completed.
380 RETURN TO MAIN ROUTINE (STEP 120)

The foregoing listing illustrates the procedure for a single camera. It is readily applied to multiple cameras. For storing contour lines from additional cameras steps 305 and 380 are modified so as to serially repeat the entire procedure for each camera.

Operational Performance

In off-line testing, using actual market prices and cants of varying dimensions, the above-described system has demonstrated results consistently superior to those obtainable by prior art edger optimization systems. It should be readily apparent from Table 1 that merely selecting the board width combination which utilizes the maximum usable width of a slab does not necessarily yield the maximum value of lumber. For example, Row 9 produces greater value from a width of 35.25 inches than does Row 10 from a width of 37 inches. For a given maximum usable cant width, there can also be several possible combinations of the same total width, each producing a different total value of lumber, for example, as shown in Rows 6–11 of Table 1.

These differences in total values become unexpectedly large when edging small cants. In wide cants, over 20 inches wide, the differences in total values of the best five combinations typically vary around 5–10%. However, for cants under 16 inches wide, this variation increases greatly, to as much as 40–50% for 10-inch wide cants.

When using the above-described system, elimination of these variables translates into commensurate increases in economic value of lumber recovered from a cant. Similar increases can accrue from the ability to maximize the useful width of each cant by adjusting the grade line to match the actual grade of the wood in the cant. Thus, the foregoing system enables substantial increases in productivity where there is the greatest unmet need, namely, in small log mills.

Having illustrated and described the principles of my invention with reference to one preferred embodiment, it should be apparent to persons skilled in the art that the invention may be modified in arrangement and detail without departing from such principles. I claim as my invention all such modifications as come within the spirit and scope of the following claims.

I claim:

1. Sawmill control apparatus for sensing the contours of a cant having a cross section defined by a pair of opposite broad faces and a pair of opposite side faces, and determining an optimum sawline normal to said broad faces, the apparatus comprising:
   beam-forming means for projecting a pair of lines of light onto each of the opposite side faces of a cant in a common plane parallel to the broad faces of the cant to form contour lines of light lengthwise along the side faces, the lines being substantially narrower than the side faces;
   light sensor means directed toward the cant at an angle to said plane for sensing the contour lines and generating an output signal corresponding thereto; and
   first means responsive to the output signal for defining, in accordance with said contour lines, a width of the cant along its length;
   second means for determining the position of a sawline relative to one of said contour lines to maximize, as a function of said width, the recovery of lumber from the cant;
   the beam-forming means being positioned to project said lines onto the sides of the cant at a predetermined position between the broad faces to define a grade line corresponding to a specified grade of lumber;
   the second means including means for computing a total value of lumber, as a function of said specified grade, can be sawn from the cant between the contour lines positioned at said grade line.

2. Apparatus according to claim 1 including means for varying the position of the contour lines normally to said broad faces to define a different grade line and thereby determine a minimum specified grade of lumber to be sawn from the cant.

3. Apparatus according to claim 1 in which the cant has a generally trapezoidal cross section and the sensor means comprises a single matrix sensor directed normal to said plane and having a two-dimensional field of view sufficient for sensing a substantial lengthwise portion of both of said contour lines.

4. Apparatus according to claim 1 in which one of the side faces of the cant is approximately normal to said broad faces and the sensor means comprises a pair of laterally-spaced matrix sensors directed toward the side faces of the cant at acute angles to said plane and having a two-dimensional field of view for detecting a substantial lengthwise portion of the contour line on said normal side face.

5. Apparatus according to claim 1 in which:
   the light sensor means comprises a matrix scanning means having a two-dimensional field of view for scanning across the cant at intervals along a substantial portion of its length simultaneously to detect each of said contour lines at each said interval and signal generating means responsive to the scanning means to generate a unique output signal value for each contour line at each interval; and
   the first means includes a means responsive to said output signals for determining a position of each contour line along said interval, memory means for storing the contour line positions in each said interval in a pair of memory locations, and means for computing a difference between the contour line positions stored in each pair of memory locations, said difference defining the width of the cant at each said interval as a function of said grade line.

6. A method of economically optimizing the sawing of boards from a cant having a pair of opposite broad faces defining a thickness of the cant and a pair of opposite side faces defining a width of the cant, the method comprising:
   storing current values of boards of different widths for a selected grade of lumber;
   projecting a thin line of light onto each opposite side face of a cant in a plane parallel to the width of the cant to form a pair of contour lines along the opposite side faces and thereby define a grade line on each side face at a predetermined position spaced between the broad faces of the cant corresponding to said selected grade;
   sensing the relative positions of the contour lines widthwise of the cant;
   positioning one of the cant and a first saw for sawing the cant lengthwise normal to said plane along a first sawline at a specified widthwise position inwardly adjacent a first one of the contour lines so as to saw the cant along the first sawline in accordance with the selected grade;
   determining a second sawline parallel to the first sawline at a widthwise position relative to the second one of said contour lines to maximize, in accordance with the stored values, the aggregate value of boards of the selected grade to be sawn from the cant, and
   positioning a second saw to saw the cant along the second sawline.

7. A method according to claim 1 in which the cant has a cross-sectional shape which is ideally, but not necessarily, rectangular and a grade determined in part by the extent of any deviations along said side faces from said rectangular shape, the method comprising positioning the lines of light normally to said plane to determine a minimum selected grade of lumber to be sawn from the cant as a function of its cross-sectional shape as defined by said grade lines.

8. A method according to claim 6 includes grading the cant to determine its grade based on a grading characteristic independent of cross-sectional shape of the cant and positioning the lines of light on the side faces of the cant so as to provide the maximum width between the contour lines for said grade determined as a function of the cross-sectional shape of the cant as defined by said grade lines.

9. A method according to claim 8 in which the storing step includes storing a different table of said values for each of at least two grades of lumber and selecting one of said tables of values in accordance with the grade determined in the grading step for use in determining said second sawline.

10. A method of economically optimizing the sawing of boards from a cant having a pair of opposite nonparallel side faces, the method comprising:
storing current values of lumber of different grades, the grade being determined by a dimensional characteristic of the lumber including an amount of corner truncation and by a nondimensional characteristic of the lumber;
storing current values of boards of different widths for a selected grade of lumber;
grading the cant in accordance with said nondimensional characteristic to determine its grade;
projecting a line of light onto each opposite side face of the cant in a plane parallel to the width of the cant to form a pair of contour lines along the opposite side faces;
positioning the lines of light normally to said plane in accordance with said grade to delineate a maximum amount of corner truncation on the side faces of said cant for said grade as a function of said dimensional characteristic; and
determining positions of at least two parallel sawlines spaced apart between said contour lines which will produce a maximum value of lumber from the cant, including lumber having said maximum amount of corner truncation.

11. A method according to claim 10 in which the step of determining the positions of the sawlines includes determining a maximum usable width of the cant between the contour lines and determining a combination of board widths having a total width, no greater than the maximum usable width, which will produce said maximum value, based on said current values of lumber.

12. A method according to claim 10 in which the step of determining the positions of the sawlines includes determining a maximum usable length of the cant, determining first tentative positions of the sawlines at said length, determining second tentative positions of the sawlines at a lesser length, and selecting the positions which yield a greater value of lumber.

13. Sawmill control apparatus for sensing the contours of an irregularly-shaped elongated wooden workpiece and determining an economically optimum sawline, comprising:
beam-forming means for projecting thin coplanar sheets of light against opposite sides of the workpiece in a predetermined plane extending lengthwise of the workpiece to form a pair of contour lines defining a widthwise dimension of the workpiece and characterizing any irregularities in the workpiece in said plane;
matrix sensor means directed normally to said plane and having a two-dimensional field of view for sensing the contour lines at a plurality of intervals along a substantial lengthwise portion of the workpiece and producing a pair of output signals corresponding to the widthwise position of the pair of contour lines at each interval;
means responsive to the pairs of output signals at each interval for determining the widthwise positions of the contour lines and computing therefrom an optimum sawline through the workpiece normal to said plane as a function of the widthwise dimension of the workpiece defined in said predetermined plane by said contour lines; and
means responsive to the computing means for positioning one of the workpiece and a saw for sawing the workpiece along said optimum sawline.

14. Apparatus according to claim 13 including memory means for storing a single number for the lateral position of each contour line at each interval so that said widthwise dimension of the workpiece between the opposite sides thereof as defined by said pair of contour lines is fully characterized by a 2 by N array of numbers, where N is the number of intervals scanned by the sensor means.

15. Apparatus according to claim 14, including means for moving one of the workpiece and beam-forming means normal to the plane to form said contour lines at different positions on the workpiece.

16. Apparatus according to claim 13, in which the computing means includes memory means for storing values of lumber of different dimensions and is operable to compute said optimum sawline in accordance with said stored values so as to maximize the economic value of lumber recovered from the workpiece.

* * * * *